United States Patent [19]

Schuh

[11] Patent Number: 5,239,579
[45] Date of Patent: Aug. 24, 1993

[54] ADAPTIVE AMPLIFIER CIRCUIT

[76] Inventor: Peter O. Schuh, 121 Forest Knoll Ln., Fishers, Ind. 46038

[21] Appl. No.: 637,655

[22] Filed: Jan. 4, 1991

[51] Int. Cl.⁵ .............................................. H04M 1/60
[52] U.S. Cl. .................................... 379/395; 379/387; 381/111
[58] Field of Search ................. 379/395, 387; 381/111, 381/112, 113, 114

[56] References Cited

U.S. PATENT DOCUMENTS

| | | | |
|---|---|---|---|
| 3,536,838 | 10/1970 | Noonan et al. | 379/395 |
| 3,867,576 | 12/1973 | Sinonsen | 379/395 |
| 4,876,712 | 10/1989 | Brint et al. | 379/387 |
| 4,918,726 | 4/1990 | Snyder | 379/395 |
| 5,036,536 | 7/1991 | Hanon et al. | 379/387 |

Primary Examiner—James L. Dwyer
Assistant Examiner—Jhancy Augustus

[57] ABSTRACT

To allow a universal replacement telephone handset, an adaptive amplifier circuit uses DC power available from a host telephone set base to discriminate between low resistance and high resistance base power supplies. It emulates either a carbon microphone or an electret microphone, whichever is appropriate for the set base. The circuit couples a microphone (10) and an output terminal (2a) through a series connection of resistor (R1), input and output leads of an amplifier (12), and a sense circuit (22). The sense circuit controls two current sources (14),(16) in response to the shunt voltage and series current available from the telephone base. Current source (14) connects the amplifier output to an input terminal (1a) and acts either as a bias current source, or as an electronic switch that provides a short circuit from the microphone to the the amplifier output. Current source (16) connects in series between the amplifier ground lead and a common terminal (2b) and acts either as a bias current source, or as an electronic switch to enable or disable the amplifier. The sense circuit has negligible series or shunt effect on voice signals except when a carbon microphone is being emulated, at which time it provides additional amplification to the voice signals at the amplifier output. Overall amplification is controlled by a negative feedback loop (20) which connects from terminal (2b) to the the amplifier input.

9 Claims, 2 Drawing Sheets

ADAPTIVE AMPLIFIER CIRCUIT

FIELD OF THE INVENTION

This invention is concerned with electronic amplifiers and, in particular, involves an adaptive amplification circuit for telephone handsets which can be used with substantially all telephone subscriber station sets.

BACKGROUND OF THE INVENTION

Telephone subscriber station sets primarily employed carbon microphones prior to the availability of practical electret microphones and semiconductor amplifiers. Modern stations sets primarily employ electret microphones which require additional amplification in the set base to duplicate the gain properties of carbon microphones. The resulting mix of these types of sets creates an undesirable situation since handsets of one type do not perform satisfactorily with set bases of the other type.

A standard handset design that automatically emulates either type of microphone has a number of benefits. One example is to allow the addition of features, such as receive amplification for the hearing impaired, transmit amplification for the weak-speaking, or both, in handsets that are portable and useable with either type set base. Another would be to reduce cost of inventory and confusion when replacing a handset.

A further understanding of the electrical characteristics of set bases and microphones used in the marketplace is useful to appreciate why, even after many years of production of each type of base, a satisfactory method of implementing a universal handset design has not been realized. Carbon microphone bases, hereinafter referred to as carbon-type bases, can be characterized as providing bias power to their handset leads from low source resistances, in the area of 100Ω, and a direct current (DC) voltage source which varies from about 3 VDC to 10 VDC over its desired operating range. Bases designed to bias electret microphones, hereinafter referred to as electret-type bases, can be characterized as providing DC power to their handset leads with high source resistances, in the range of 2KΩ a voltage source which ranges from about 1.5 VDC to 10 VDC. Low source voltages are associated with long loops from the central office and multiple off-hook telephone sets. High source voltages are associated with short loops and a single off-hook telephone set. The current and voltage levels associated with these parameters present a difficulty that prior art has been unable to resolve.

When an electret microphone equivalent is connected to the base, both types of bases can provide bias voltages of the same magnitude. When a carbon microphone equivalent is presented to the base, both types of bases can provide bias currents of the same magnitude. Thus, seemingly paradoxical conditions exist when attempting to automatically emulate the appropriate microphone by using voltage or current characteristics of a base.

Most prior art uses a combination of manually operated switches, programming plug connectors, and potentiometers, to provide compatibility with different type bases, resulting in problems of inconvenience, confusion, and error in settings by untrained users. Examples of these mechanical solutions can be found in U.S. Pat. No. 4,876,712 issued to Gary T. Brint et al., on Oct. 24, 1989 and U.S. Pat. No. 4,918,726 issued to Gary K. Snyder on Apr. 17, 1990. U.S. Pat. No. 3,536,838, issued to John M. Noonan and Peter O. Schuh on Oct. 27, 1970 discloses the use of different levels of available line current to automatically adapt an amplifier to two different types of hybrid coil environments. However it lacks the capability to cope with the aforementioned overlapping voltage and current conditions.

Accordingly, a broad object of the invention is to provide an adaptive amplifier circuit having methodology to sense the type of telephone set base with which it is operating and the capability to adapt itself automatically to emulate the desired electrical characteristics of either an electret microphone or a carbon microphone. A further objective is to provide an adaptive amplifier circuit that operates from telephone set line power.

SUMMARY OF THE INVENTION

The invention achieves the above stated and additional objects by combining an amplifier, a negative alternating current (AC) feedback loop, two current sources, and a series current and shunt voltage sense circuit which controls the current sources in response to varying levels of DC line current and line voltage from a host telephone set base. The current sources are capable of acting as conventional DC bias sources or, when respectively cut-off (non-conducting) or overdriven (saturated), act as high-loss or low-loss electronic switches. When the line current and line voltage meet predetermined conditions that represent a high resistance line supply, one current source, in a high-loss state, disables the amplifier. The other current source, in a low-loss state, connects the microphone around the amplifier to the output port through the sense circuit which has negligible effect on the signals passing through it under these conditions. Alternatively, when the combination of line current and line voltage meet predetermined conditions that represent a low resistance base supply, the sense circuit configures the current sources to enable the amplifier to couple the output of the microphone to the telephone set base through the gain of the amplifier.

BRIEF DESCRIPTION OF THE DRAWINGS

The aforementioned and other features and advantages of the instant invention will become more readily apparent to persons skilled in the art by reference to the following detailed descriptions when read in light of the accompanying drawings in which.

DETAILED DESCRIPTION: GENERAL EMBODIMENT—FIG. 1

Figure 1:
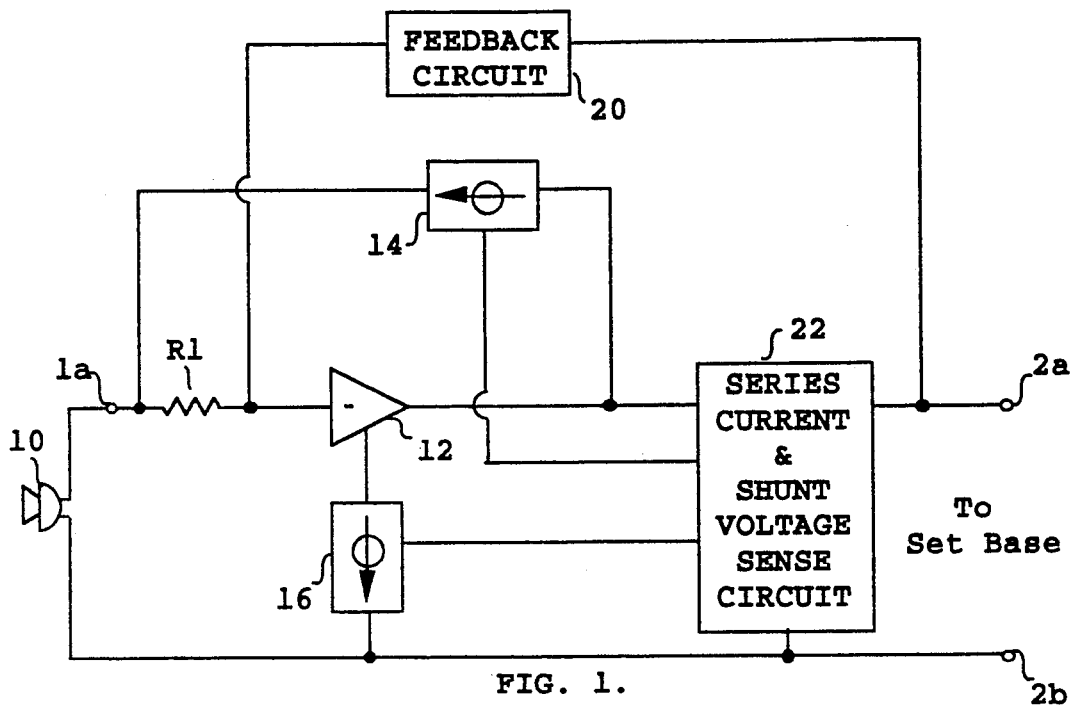
FIG. 1 is a block diagram of a generalized circuit form in accordance with the invention.

Now referring to the accompanying drawing FIG. 1, a general embodiment of the invention will be described.

When used in telephone applications, voice signals are received from a microphone 10 which is connected across an input port comprising terminal 1a and a common terminal 2b. Voice signals are presented to the set base, and DC operating power is received from the set base, through the base's handset microphone port which is connected across an output port comprising terminal 2a and terminal 2b. First and second leads of a series-current and shunt voltage sense circuit 22 are connected in parallel across terminals 2a, 2b. The first and a third lead of sense circuit 22 are connected in series between terminal 2a and the output of an inverting amplifier 12. A resistor R1 is connected from terminal 1a to the input of the amplifier. A two terminal negative feedback circuit 20 is connected to the input of the amplifier from terminal 2a. A first current source 16 is connected between the ground lead of the amplifier and terminal 2b. A second current source 14 is connected from the output of amplifier 12 to terminal 1a. In response to varying levels of line voltage and current at terminals 2a, 2b, current sources 14 and 16 are controlled by the sense circuit to configure the adaptive amplifier circuit into either an electret mode or a carbon mode, as will now be described.

DETAILED DESCRIPTION: ELECTRET MODE—FIG. 1 a) When the line voltage is below a predetermined threshold Vo, and the line current is below a predetermined threshold Io: Current source 16 is controlled by sense circuit 22 to be non-conducting, thereby disabling amplifier 12. Current source 14 is controlled by the sense circuit to be saturated, thereby serving as a low-loss electronic switch between microphone 10 and the sense circuit. The sense circuit is, by definition, non-intrusive when line current and voltage are below their threshold levels. That is, the sense circuit has negligible series or shunt effect on the AC and DC signals passing through it or across it. Thus, the microphone is effectively connected across terminals 2a, 2b, with no deleterious effects from the aforementioned elements. In the specific application of the invention to replace a handset having an electret microphone, microphone 10 is selected to be an electret type, with minimum current and voltage bias chosen to be less than the previously mentioned threshold levels. The above arrangement advantageously allows operation from line power at long loops where the voltage and current available from an electret-type base are severely limited, indeed barely sufficient to bias the original microphone.

b) When the line voltage is at Vo, and the line current is below Io: Current source 16 is controlled by sense circuit 22 to be active and draw as much current through amplifier 12 as is required to hold the DC line voltage relatively constant at a level of Vo. In this manner, the base port is loaded to test its capability to concurrently provide threshold current and voltage. The amplifier is kept from providing AC gain because of the high AC impedance of current source 16. As previously described in paragraph a), current source 14 is saturated and the sense circuit is non-intrusive to system AC and DC signals. Thus the microphone is still effectively coupled to terminal 2a, with no significant AC gain or loss being supplied by the amplification circuit. Any DC current drawn through current source 16 is in excess of minimum bias needs of the microphone. It is understood that the microphone must be selected to draw less than Io bias current at voltage Vo for the conditions of the electret mode to be maintained.

DETAILED DESCRIPTION: CARBON MODE—FIG. 1

When the line voltage is at or above Vo and the line current is at or above Io: Current source 16 is controlled to be saturated, thereby enabling amplifier 12. Current source 14 is controlled to be active, thereby still providing DC bias current at terminal 1a, but in a state of high AC impedance. AC voltage gain between terminals 1a, 2a is controlled by feedback circuit 20 in ratio with the series combination of resistor R1 and the source impedance of microphone 10, as is well known to those skilled in the art. Thus signals from microphone 10 are amplified before being presented to terminal 2a. The level of amplification is chosen to boost the output of the microphone to that of a carbon transmitter.

The relationship of threshold levels Vo, Io and the line voltage and current are further described below, where:

Vs is the line supply source voltage.
Rs is the line supply source resistance.

Then, when line current and voltage are exactly at their threshold levels, an equation describing the relationship between the above variables can be written as $Rs = Vs/Io - Vo/Io$. This equation allows a determination of the combinations of Rs and Vs for either either mode of operation. If $Rs > Vs/Io - Vo/Io$, then the line current and voltage cannot concurrently be at their threshold level and the amplification circuit will be configured in the electret mode. Conversely, if $Rs \leq Vs/Io - Vo/Io$, the circuit will be configured in the carbon mode, with the understanding that, in practice, Vo is set below the minimum Vs expected for a carbon-type base.

For example, if Io is set at 4 mA and Vo is set at 2.3V, and if the minimum Vs for a carbon-type base is 3 VDC, then the equation can be used to determine that a value for $Rs \leq 175\Omega$ will assure that the line voltage and current are at, or greater than, their respective threshold levels, and that only the carbon mode will be configured in connection with carbon-type bases. Similarly, for a maximum source voltage of 10 VDC from an electret-type base, and for the above mentioned settings for Vo and Io, a set base with a source resistance $Rs > 1925\Omega$ will assure the circuit is configured in an electret mode. In this manner, the invention compares available line voltage and current with predetermined threshold levels to determine into which binary value class the source resistance falls. That is, the invention provides the capability to automatically identify whether source resistances belong to a high resistance class, or a low resistance class, even though their respective source voltages may vary over a wide range.

DETAILED DESCRIPTION—SPECIFIC EMBODIMENT OF FIG. 2

Now referring to FIG. 2, and recalling the detailed description of the general embodiment of the invention depicted in FIG. 1, a preferred specific embodiment of the invention will be described.

Amplifier 12 is comprised of a transistor Q3 with its base, collector and emitter terminals being the input, output and ground leads, respectively of amplifier 12.

Current source 16 is comprised of a transistor Q5 with its collector connected to the ground lead of amplifier 12, its emitter connected to terminal 2b, its base connected to a fourth terminal of sense circuit 22 and a capacitor C2 which is connected in parallel with the base and emitter of transistor Q5.

Current source 14 is comprised of a transistor Q1 with its collector connected to terminal 1a, its emitter connected to the output of amplifier 12 and the third terminal of sense circuit 22, its base connected to a fifth lead of the sense circuit, and a capacitor C1 connected in parallel across the base and emitter of transistor Q1.

Feedback circuit 20 is comprised of a resistor R6 connected in series with a capacitor C3.

Sense circuit 22 is comprised of a transistor Q4 with a resistor R5 connected in parallel across its base and emitter leads, resistors R2,R3 connected in voltage divider series fashion between the base of transistor Q1 and terminal 2b, and a parallel combination of a resistor R4 and a diode D1 connected between the base of transistor Q5 and the common point of resistors R2,R3. The collector of Q4 is also connected to the common point of resistors R2,R3.

Line current into terminal 2a is detected to be at its threshold level Io when the current through resistor R5 and the parallel connected emitter-to-base resistance of transistor Q4 is sufficient to activate transistor Q4. In practice, the value of resistor R5 is chosen have a DC voltage drop sufficient to activate transistor Q4 when the line current reaches its threshold level. The current threshold can be approximately computed as $I_o = V_{be}/R5$ where Vbe is about 0.6 VDC and the base current of transistor Q4 is considered negligible relative to Io. When active, transistor Q4 functions as a control circuit and, advantageously, as both a second stage amplifier and as a sink of excess line currents in the carbon mode. Below current threshold, transistor Q4 is inactive.

Line voltage is detected to be at its threshold level Vo when the voltage at the common point of resistors R2,R3 is sufficient to activate transistor Q5 through the parallel combination of diode D1 and resistor R4. It can be shown that $V_o = V_{be}(2 + R2/R3)$ where the voltages dropped across resistors R4 and R5 are considered negligible in comparison with Vo. Since transistor Q5 is connected in series with the emitter of transistor Q3, when transistor Q5 is inactive, transistor Q3 is also inactive.

Capacitors C1 and C2 provide AC filtering to voice band signals so that transistors Q1 and Q5, when active, can serve as current sources that are unresponsive to the system voice signals. Relative to resistor R4, diode D1 has no appreciable effect until diode D1 and transistor Q5 are driven into saturation, as will be explained in a forthcoming carbon mode description. The series combination of resistor R6 and capacitor C3 provides an AC negative feedback path to the amplifier input lead from terminal 2a. In ratio with the series combination of resistor R1 and the source impedance of microphone 10, feedback circuit 20 determines the AC voltage gain, as previously described.

A short circuit could replace resistor R1 without affecting the primary operation of the invention. However, resistor R1 primarily determines the AC load on the microphone in the carbon mode, while the impedance presented by the set base at terminals 2a, 2b primarily determines the AC load on the microphone in the electret mode. Thus one may choose the value of resistor R1 to keep the loading on the microphone signal to be about the same for either mode, an advantage in applications of the invention in voice.-witching systems where a constant transmit reference signal is desirable.

The operation of the circuit of FIG. 2 will now be described in a fashion analogous to the above description for FIG. 1.

DETAILED DESCRIPTION: ELECTRET MODE—FIG. 2 a) Line voltage and current are below threshold levels: Through the series bias path consisting of resistor R5, emitter-to-base terminals of transistor Q1, and resistors R2,R3, transistor Q1 is controlled to be saturated and thus serve as a low-loss electronic switch. Resistors R2,R3 are chosen to be of sufficiently small value to saturate transistor Q1 when transistor Q4 is inactive, but sufficiently large to provide no significant shunt loss. Transistors Q3, Q4, Q5 are inactive as previously described for conditions below threshold levels. Thus, when the value of resistor R5 is chosen to provide no significant series effect, and with transistor Q1 serving as a low-loss electronic switch, the microphone is effectively coupled to output terminals 2a, 2b for both AC and DC signals.

b) Line voltage is at its threshold level, and line current is below its threshold level: Transistor Q1 is controlled to be saturated as described above. Transistor Q5 is controlled to serve as a current source in series between the emitter of transistor Q3 and terminal 2b, and to draw only as much current from the base port through transistor Q3 as is required to regulate the DC voltage at terminal 2a to about Vo. The AC gain of transistor Q3 is nil because of the high AC impedance of transistor Q5. Thus the microphone is still effectively coupled to output terminal 2a.

DETAILED DESCRIPTION: CARBON MODE—FIG. 2

When the line voltage is at or above Vo and the line current is at or above Io: When line current reaches its threshold level, transistor Q4 becomes active and starts a positive feedback cycle described as follows: Through the parallel combination of diode D1 and resistor R4, the collector of transistor Q4 drives transistor Q5, which in turn drives transistor Q3, which in turn provides regenerative drive to transistor Q4. During this cycle, the voltage at the collector of transistor Q4 increases which reduces the bias voltage at the emitter-base junction of transistor Q1 until transistor Q1 is driven out of saturation and becomes active. Hence, transistor Q1 tends to override the above mentioned positive feedback action by providing negative DC feedback through resistor R1 to the base of transistor Q3. The negative feedback controls the current into the collector of transistor Q3 to be about Io, but with the stated feedback of transistors Q1,Q4 now controlling the level of its current, rather than transistor Q5. The increased drive from the collector of transistor Q4 saturates transistor Q5 which provides a low-loss connection from the emitter of transistor Q3 to terminal 2b. Transistor Q4 shunts available line current in excess of Io through diode D1 and the emitter-base junction of transistor Q5, thus saturating these two elements to provide a low-loss connection to terminal 2b from the collector of transistor Q4. Transistor Q3 amplifies voice signals received from terminal 1a through resistor R1 and couples the amplified signal to the base of transistor Q4. Advantageously, transistor Q4 serves as an emitter follower-type amplifier to help drive low impedance loads at terminals 2a, 2b. Feedback loop 20 controls the closed loop gain of transistors Q3, Q4, as previously described. Thus the adaptive amplifier automatically configures itself to provide gain between terminals 1a, 2a. The described positive feedback action is a feature of the invention that assures that the adaptive amplifier circuit is securely in an operating state emulating either a carbon microphone or an electret microphone, and not between states.

Figure 2:
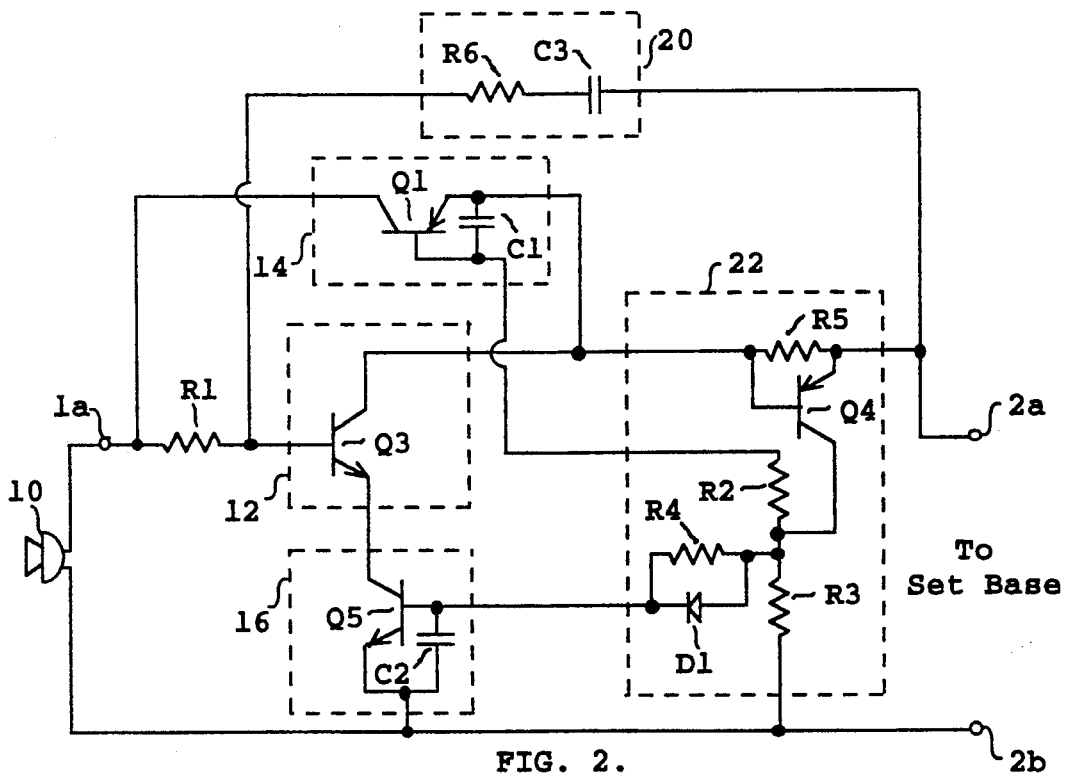
FIG. 2 is a schematic circuit diagram of a preferred specific circuit in keeping with the form illustrated generally in FIG. 1.

By way of example only, and not in any respect limiting the invention, the following component values and types may be employed to successfully practice the circuit of FIG. 2, with carbon-type bases such as AT&T-2500 series sets and electret-type bases such as AT&T-700 series sets:

Q1,Q4=PNP silicon transistor
Q3,Q5=NPN silicon transistor
D1=silicon rectifier diode
R1,R2,R4=5.6KΩ
R3=10KΩ
R5=150Ω
R6=27K
C1,C2=22 μf
C3=0.1 μf
Microphone 10=EM80P microphone, such as available from Primo Microphone, Inc., Tokyo, Japan

DETAILED DESCRIPTION: ALTERNATIVE EMBODIMENT OF FIG. 3

Figure 3:
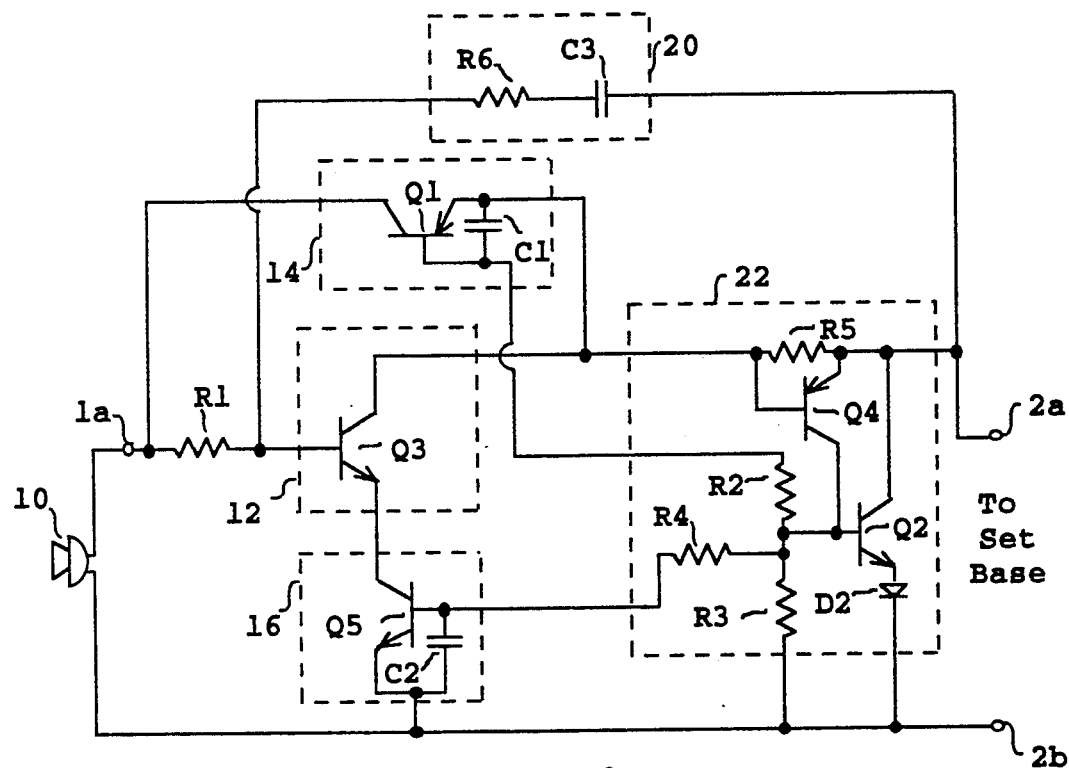
FIG. 3 is an alternate configuration of the invention of FIG. 2 where an additional stage of amplification is disclosed.

Referring to FIGS. 2 and 3 and the above description for FIG. 2, an alternative embodiment of the invention that provides for additional amplification will now be described.

By removing diode D1 from across resistor R4 of the circuit of FIG. 2 and adding a transistor Q2 and a diode D2, one achieves the circuit depicted in FIG. 3. The collector and base of transistor Q2 connect respectively to the emitter and collector of transistor Q4. The collector of transistor Q2 connects to common terminal 2b through diode D2, with the cathode of diode D2 connecting to terminal 2b.

Diode D2 provides a voltage off-set to keep transistor Q2 inactive until transistor Q4 becomes active. Thus, under electret mode conditions, Q2 is inactive and, under carbon mode conditions, it is active. When active, transistor Q2 receives the output of the collector of Q4 and provides current amplification to the base port. Thus, the operation of the circuits of FIGS. 2 and 3 are essentially the same in the electret mode, but the circuit of FIG. 3 provides an additional stage of current amplification in the carbon mode. Since an additional transistor is required relative to FIG. 2., it is not a preferred embodiment, but is an example of variations possible within the spirit of the invention.

It is understood that the embodiments described herein are merely illustrative of the principles of the invention. Various modifications may be made thereto by persons skilled in the art without departing from the scope of the invention. Additionally, while the invention is primarily directed at telephone handset applications, it could be employed equally as well in telephone bases, modular in-line amplifiers, operator head telephone sets or other situations requiring a line-powered amplifier. It is my intention that the following claims cover all equivalent modifications and variations as followed within the scope of the invention.

What I claim is:

1. An apparatus for controllably amplifying an audio signal delivered to a telephone transmit port circuit having levels of direct current and direct voltage, comprising:

sense means coupled to said circuit for producing and delivering a control signal and for providing a change in said control signal when said circuit voltage level is at least as great as a voltage threshold level and said circuit current level is at least as great as a current threshold level;

receive means coupled to said sense means and arranged to receive said audio signal and coupled to said circuit, for receiving the audio signal, and for providing amplification to the audio signal, and for delivering the amplified audio signal to said circuit in response to receiving said change in said control signal; and said receive means further including means to avoid said amplification and to deliver said audio signal virtually unchanged to said circuit in the absence of said change in said control signal.

2. An amplification circuit for coupling a microphone to a transmit port, comprising: an amplifier;

first and second current sources coupled to the amplifier, the microphone also being coupled to the amplifier;

sense means coupled to the transmit port and the current sources and the amplifier for sensing line voltage and line current from the transmit port below predetermined voltage and current levels to adjust the current sources to disable the amplifier, and to provide a virtually lossless connection between the microphone and transmit port;

said sense means including means for sensing line voltage at the predetermined voltage level to adjust the first current source to maintain relatively constant DC voltage at the transmit port; and said sense means further including means for sensing line current at a level at least as great as the predetermined current level to adjust the first and second current sources to enable the amplifier to provide amplification between the microphone and transmit port.

3. An amplification circuit for adaptively interfacing a first type of microphone to a transmit base port with varying levels of DC current and DC voltages comprising:

an output port comprising an output terminal and a common terminal for coupling said output port to said base port for delivering voice signals from the first type of microphone and for receiving said DC current and DC voltage;

an input port comprising an input terminal and said common terminal, said input port connecting to the first type of microphone for receiving voice signals;

an amplifier having an input lead, an output lead, and a ground lead;

input means connecting said input terminal to said amplifier input lead;

a first current source connected in series between said amplifier ground lead and said common terminal;

a second current source connected across said amplifier output lead and said input terminal; and sense means coupled to said output port and to said first and second current sources and to said amplifier output lead, for providing at said base port the electrical characteristics of the first type of microphone in response to said DC current and DC voltage being below predetermined threshold levels, and for providing the electrical characteristics of a second type of microphone in response to said DC current and DC voltage being at least as great as the a predetermined levels.

4. The amplification circuit in accordance with claim 3 wherein said amplifier is a transistor with collector, emitter and base terminals, said base terminal being said amplifier input lead, said collector terminal being said amplifier output lead, and said emitter terminal being said amplifier ground lead.

5. The amplification circuit in accordance with claim 3 wherein said input means comprises a first resistor connected between said input terminal and said amplifier input lead, said first resistor providing means to control loading of said microphone for use with voice-switched application.

6. The amplifier circuit in accordance with claim 3 further including a negative feedback loop connecting across said output terminal and said amplifier input lead.

7. The amplification circuit in accordance with claim 3 wherein:

said first current source comprises a first capacitor and a first transistor having collector, emitter and base terminals, said collector and emitter terminals of the first transistor respectively connecting in series between said amplifier ground lead and said common terminal, and said first capacitor connected in parallel with the emitter and base terminals of said first transistor; and said second current source comprises a second capacitor and a second transistor having collector, emitter and base terminals, said collector and emitter terminals respectively connected in parallel across said input terminal and said amplifier output terminal, and said second capacitor connected in parallel with the second transistor base and emitter terminals.

8. The amplifier circuit in accordance with claim 7 wherein said sense means comprises:

a third transistor having collector, emitter and base terminals, said third transistor base terminal connecting to said amplifier output lead, and said third transistor emitter terminal connecting to said output terminal, said third transistor providing amplification to signals from said amplifier output lead in response to said DC current being at least as great as said current threshold;

a second resistor connected in parallel combination with said third transistor base and emitter terminals, said parallel combination providing means of adjusting said current threshold level;

a third resistor with a first terminal connecting to the collector of said third transistor and a second terminal connecting to said common terminal;

a fourth resistor with a first terminal connecting to said third resistor first terminal, and a second terminal connecting to said second transistor base terminal, wherein the ratio in resistance between said third and fourth resistors determines a reference voltage for controlling said second current source;

a diode having cathode and anode terminals, said anode terminal connecting to said third resistor first terminal and said cathode terminal connecting to said first transistor base terminal; and a fifth resistor connected in parallel with said diode.

9. The amplifier circuit in accordance with claim 7 wherein said sense means comprises:

a third transistor having collector, emitter and base terminals, said third transistor base terminal connecting to said amplifier output lead and said third transistor emitter terminal connecting to said output terminal;

a second resistor connected in parallel combination with said third transistor base and emitter terminals, said parallel combination providing means of adjusting said current threshold level;

a fourth transistor having collector, emitter and base terminals, said fourth transistor collector terminal connecting to said third transistor emitter terminal, said fourth transistor base terminal connecting to said third transistor collector terminal, said third and fourth transistors providing amplification to signals from said amplifier output lead in response to said DC current being at least as great as said current threshold;

a diode with anode cathode terminals, said anode terminal connecting to said fourth transistor emitter terminal, said cathodes terminal connected to said common terminal a third resistor with a first terminal connecting to the collector of said third transistor and a second terminal connecting to said common terminal; a fourth resistor with a first terminal connecting to said third resistor first terminal, and a second terminal connecting to said second transistor base terminal, wherein the ratio is resistance between said third and fourth resistors determines a reference voltage for controlling said second current source; and a fifth resistor connected between said third resistor first terminal and said first transistor base terminal.

* * * * *